United States Patent
Venkatesh et al.

(10) Patent No.: US 9,565,113 B2
(45) Date of Patent: Feb. 7, 2017

(54) ADAPTIVE LINK AGGREGATION AND VIRTUAL LINK AGGREGATION

(71) Applicant: BROCADE COMMUNICATIONS SYSTEMS, INC., San Jose, CA (US)

(72) Inventors: Vardarajan Venkatesh, Santa Clara, CA (US); Ganesh D. Venkata, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 284 days.

(21) Appl. No.: 14/156,374

(22) Filed: Jan. 15, 2014

(65) Prior Publication Data

US 2014/0198656 A1 Jul. 17, 2014

Related U.S. Application Data

(60) Provisional application No. 61/752,856, filed on Jan. 15, 2013.

(51) Int. Cl.
*H04L 12/891* (2013.01)
*H04L 12/803* (2013.01)
*H04L 12/725* (2013.01)
*H04L 12/709* (2013.01)

(52) U.S. Cl.
CPC ............ *H04L 47/125* (2013.01); *H04L 45/30* (2013.01); *H04L 45/245* (2013.01)

(58) Field of Classification Search
CPC .... H04L 45/245; H04L 47/125; H04L 47/726; H04L 47/728; H04L 2012/568
See application file for complete search history.

(56) References Cited

U.S. PATENT DOCUMENTS

| | | | |
|---|---|---|---|
| 829,529 | A | 8/1906 | Keathley |
| 5,390,173 | A | 2/1995 | Spinney |
| 5,802,278 | A | 9/1998 | Isfeld |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Rosen, E. et al., "BGP/MPLS VPNs", Mar. 1999.

(Continued)

*Primary Examiner* — Hoon H Chung
(74) *Attorney, Agent, or Firm* — Shun Yao; Park, Vaughan, Fleming & Dowler LLP

(57) ABSTRACT

One embodiment of the present invention provides a switch. The switch comprises a plurality of ports, a link management module, a forwarding module, and a link adaptation module. The link management module operates at least two ports of the plurality of ports of the switch to form a link aggregation. This link aggregation operates as a single logical channel. The forwarding module determines an egress port for a packet among the ports participating in the link aggregation based on a distribution policy. The link adaptation module detects an imbalance of the respective link utilizations among links of the link aggregation based on one or more imbalance criteria, and applies one or more corrective actions to the distribution policy.

29 Claims, 10 Drawing Sheets

(56) References Cited

U.S. PATENT DOCUMENTS

| | | |
|---|---|---|
| 5,878,232 A | 3/1999 | Marimuthu |
| 5,959,968 A | 9/1999 | Chin |
| 5,973,278 A | 10/1999 | Wehrli, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1* | 12/2002 | Bass et al. ............ 370/230.1 |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Signhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1* | 1/2015 | Kumar et al. ............ 370/235 |
| 8,995,272 B2 | 3/2015 | Agarwal |
| 9,438,447 B2* | 9/2016 | Basso ............ H04L 12/5689 |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |

(56) References Cited

U.S. PATENT DOCUMENTS

| | | |
|---|---|---|
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0093254 A1 | 5/2006 | Mozdy |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1* | 9/2007 | Chandra ............ H04L 65/80 379/220.01 |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |

(56) References Cited

U.S. PATENT DOCUMENTS

| | | |
|---|---|---|
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1* | 5/2012 | Roitshtein ............ H04L 47/125 709/225 |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0230225 A1* | 9/2012 | Matthews ............ H04L 47/125 370/255 |
| 2012/0230800 A1 | 9/2012 | Kimura |
| 2012/0243359 A1 | 9/2012 | Katoch |
| 2012/0243539 A1 | 9/2012 | Keesara |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0294451 A1 | 11/2013 | Li |
| 2013/0301642 A1 | 11/2013 | Radhakrishnan |
| 2013/0346583 A1 | 12/2013 | Low |
| 2014/0013324 A1 | 1/2014 | Zhang |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1 | 1/2015 | Matsuhira |
| 2015/0030031 A1 | 1/2015 | Zhou |
| 2015/0143369 A1 | 5/2015 | Zheng |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 2001167 A1 | 8/2007 |
| EP | 1916807 A2 | 10/2007 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office Action for U.S. Appl. No. 14/577,785, filed Dec. 19, 2014, dated Apr. 13, 2015.

Office Action for U.S. Appl. No. 13/786,328, filed Mar. 5, 2013, dated Mar. 13, 2015.

Office Action for U.S. Appl. No. 13/425,238, filed Mar. 20, 2012, dated Mar. 12, 2015.

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.

Zhai F. Hu et al. 'RBridge: Pseudo-Nickname; draft-hu-trill-pseudonode-nickname-02.txt', May 15, 2012.

Mahalingam "VXLAN: A Framework for Overlaying Virtualized Layer 2 Networks over Layer 3 Networks" Oct. 17, 2013 pp. 1-22, Sections 1, 4 and 4.1.

Office action dated Apr. 30, 2015, U.S. Appl. No. 13/351,513, filed Jan. 17, 2012.

Office Action dated Apr. 1, 2015, U.S. Appl. No. 13/656,438, filed Oct. 19, 2012.

Office Action dated May 21, 2015, U.S. Appl. No. 13/288,822, filed Nov. 3, 2011.

(56) References Cited

OTHER PUBLICATIONS

Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438 filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 3/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,724, filed Apr. 22, 2011.
Office Action dated Mar. 14, 2014, U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.

(56) References Cited

OTHER PUBLICATIONS

Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
Trill Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for Application No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Huang, Nen-Fu et al. "An Effective Spanning Tree Algorithm for a Bridged LAN", Mar. 16, 1992.
Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundry FastIron Configuration Guide, Software Release FSX 04.2.00b, Software Release FWS 04.3.00, Software Release FGS 05.0.00a, 2008.
FastIron and TurboIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.

(56) References Cited

OTHER PUBLICATIONS

Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) September, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13092701, filed Apr. 22, 2011.
Office action dated Jul. 3, 2013, U.S. Appl. No. 13/092,701, filed Apr. 22, 2011.
Office action dated Feb. 5, 2013, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

* cited by examiner

ADAPTIVE LINK AGGREGATION AND VIRTUAL LINK AGGREGATION

RELATED APPLICATIONS

This application claims the benefit of U.S. Provisional Application No. 61/752,856, titled "Adaptive Link Aggregation and Virtual Link Aggregation," by inventors Vardarajan Venkatesh and Ganesh D. Venkata, filed 15 Jan. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and U.S. patent application Ser. No. 12/725,249, titled "Redundant Host Connection in a Routed Network," by inventors Somesh Gupta, Anoop Ghawani, Phanidhar Koganti, and Shunjia Yu, filed 16 Mar. 2010, the disclosures of which are incorporated by reference herein.

BACKGROUND

Field

The present disclosure relates to network management. More specifically, the present disclosure relates to a method and system for providing adaptive link aggregations (LAGs) and virtual link aggregations (VLAGs).

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As more time-critical applications are being implemented in data communication networks, high-availability operation is becoming progressively more important as a value proposition for network architects. It is often desirable to aggregate multiple links to a switch (referred to as a link aggregation), or links to multiple switches (referred to as a virtual link aggregation or a multi-chassis trunk) to operate as a single logical link to facilitate load balancing among the multiple links/switches while providing redundancy. This ensures that a link failure, or a device failure for the case of a virtual link aggregation, would not affect the data flow. A switch participating in a virtual link aggregation can be referred to as a partner switch of the virtual link aggregation.

Currently, such link aggregations or virtual link aggregations in a network have not been able to provide efficient adaptive forwarding for different traffic flows. A traffic flow is often identified based on a source address, a destination address, and/or corresponding ports. If the packets of different traffic flows are forwarded via only a few specific links of the (virtual) link aggregation, while the other links remain underutilized, the (virtual) link aggregation may not be able to redistribute the packets to use the underutilized links. As a result, the packets become bottlenecked at those specific links and fail to utilize the bandwidth offered by the other links of the (virtual) link aggregation.

While link aggregation and virtual link aggregation bring many desirable features to networks, some issues remain unsolved in efficient adaptive forwarding.

SUMMARY

One embodiment of the present invention provides a switch. The switch comprises a plurality of ports, a link management module, a forwarding module, and a link adaptation module. The link management module operates at least two ports of the plurality of ports of the switch to form a link aggregation. This link aggregation operates as a single logical channel. The forwarding module determines an egress port for a packet among the ports participating in the link aggregation based on a distribution policy. The link adaptation module detects an imbalance of the respective link utilizations among links of the link aggregation based on one or more imbalance criteria, and applies one or more corrective actions to the distribution policy.

In a variation on this embodiment, when the corrective actions have been applied to the distribution policy, the link adaptation module also monitors the link utilizations of the links of the link aggregation.

In a variation on this embodiment, the link adaptation module stops applying corrective actions based on the monitored link utilizations' compliance with one or more of: (i) reaching an upper bound of the number of corrective actions to be applied; and (ii) meeting convergence criteria. The convergence criteria include one or more of: (i) achieving a better balance of link utilizations among links of the link aggregation compared to the detected imbalance; and (ii) achieving compliance with the one or more imbalance criteria.

In a further variation, the link adaptation module applies fallback settings to the distribution policy in response to reaching the upper bound and applies corrective settings to the distribution policy in response to meeting the convergence criteria.

In a variation on this embodiment, the imbalance criteria include one or more of: (i) a number of links in the link aggregation having higher utilization than a high threshold; and (ii) a number of links in the link aggregation having lower utilization than a low threshold.

In a variation on this embodiment, the distribution policy includes one or more of: (i) a hash function; and (ii) a modulo function generating an index for a hash distribution table. A respective slot in the hash distribution table is associated with a link of the link aggregation. The input of the hash function includes one or more fields of a packet. The input of the modulo function includes output of the hash function.

In a further variation, a corrective action includes one or more of: (i) swapping adjacent bits of the input of the hash function; (ii) changing flavor of the hash function by selecting one of more different fields of the packet as the input of the hash function; (iii) changing flavor of the hash function by using a different hash computation; and (iv) changing the association between one or more slots in the hash distribution table and the corresponding link of the link aggregation.

In a variation on this embodiment, the link utilization of a link in the link aggregation is based on a weighted average of a measured link utilization and historical link utilization of the link.

In a variation on this embodiment, the link management module operates a port of the plurality of ports of the switch in conjunction with a remote switch to form a virtual link aggregation. This virtual link aggregation operates as a single logical channel. The link adaptation module detects an imbalance of respective overall utilizations of links of the virtual link aggregation between the switch and the remote switch based on one or more imbalance criteria.

In a further variation, the switch also includes a designated switch management module which identifies the switch as a designated switch for the virtual link aggregation. The link adaptation module generates an instruction for an ingress switch of the packet to apply one or more corrective actions to a path selection policy for the virtual link aggregation. This path selection policy selects an egress switch for the packet among the switch and the remote switch.

In a further variation, when the corrective actions have been applied to the distribution policy, the link adaptation module generates a query message for the remote switch to obtain monitored link utilizations of the links of the virtual link aggregation. The link adaptation module also determines whether to stop applying the corrective actions to the path selection policy and/or the distribution policy based on local monitored link utilizations and obtained monitored link utilizations from the remote switch.

In a variation on this embodiment, the switch is a member of an Ethernet fabric switch, which incorporates a plurality of physical switches coupled in an arbitrary topology logically operating as a single switch. The switch is associated with an identifier of the Ethernet fabric switch.

BRIEF DESCRIPTION OF THE FIGURES

In the figures, like reference numerals refer to the same figure elements.

DETAILED DESCRIPTION

Figure 1A:
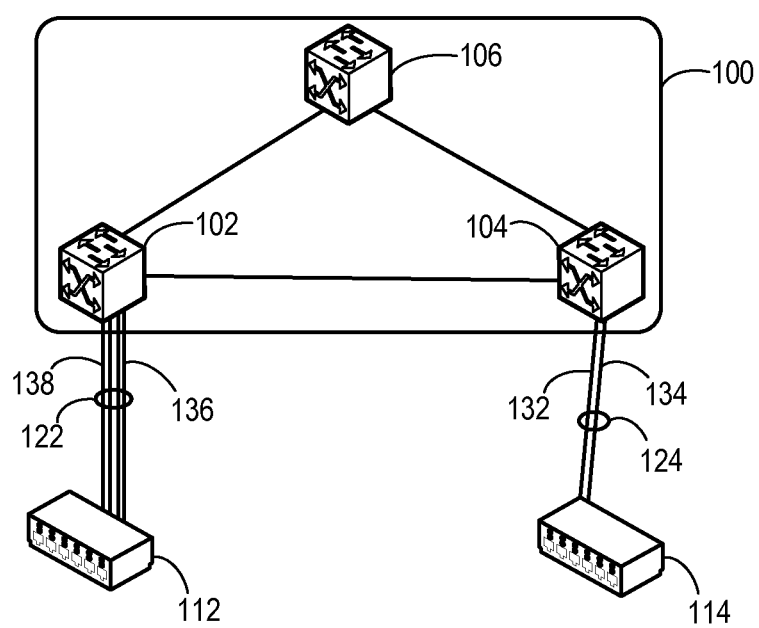
FIG. 1A illustrates exemplary adaptive link aggregations, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing traffic flow adaptation via a link aggregation or a virtual link aggregation is solved by dynamically balancing the imbalanced traffic flows across the links of the (virtual) link aggregation based on link utilization. Exemplary representations of link utilization include, but are not limited to, fraction of the link bandwidth used, traffic load on the link, residual bandwidth of the link, latency via the link, and a combination thereof. A link in a (virtual) link aggregation can also be identified by a port associated with that link. In this disclosure, the terms "link" and "port" are used interchangeably to indicate participation in a virtual link aggregation.

A traffic flow is often identified based on a source address, a destination address, and/or corresponding ports. With existing technologies, a switch typically distributes packets of different traffic flows across the links of a link aggregation based on the nature of the traffic flows and a distribution policy. The nature of the traffic flow indicates the flow identifying information, content, and/or type of the traffic flow. The distribution policy, which can also be referred to as a spraying algorithm, indicates how the forwarding links for a traffic flow of a particular nature should be selected. For example, the distribution policy can be based on a hash function applied to one or more fields of the packets of the traffic flow. However, depending on the nature of traffic flow and the distribution policy, these packets may be forwarded via only a few specific links of the link aggregation. As a result, these specific links can become over-utilized and the other links remain underutilized, thereby causing imbalance in the distribution of traffic in the link aggregation. Such imbalance leads to adverse network conditions, such as congestions and packet drops, and causes reduced network performance, such as high latency.

This problem can further aggravate if the link aggregation is a virtual link aggregation spanning a plurality of switches. A switch participating in a virtual link aggregation can be referred to as a partner switch of the virtual link aggregation.

The packets of different traffic flows can not only be distributed across the aggregated links of a switch, but also across the partner switches. As a result, the imbalance of traffic can be across the partner switches as well as the local links of a partner switch. For example, depending on the nature of the traffic flow and the path selection policy, the packets may be forwarded via only one of the partner switches of a virtual link aggregation. Consequently, that partner switch's links in the virtual link aggregation, can become over-utilized and the other partner switches' links in the virtual link aggregation remain underutilized. Furthermore, an imbalance can also occur among that partner switch's links in the virtual link aggregation, thereby causing a multi-tier imbalance in the virtual link aggregation.

To solve this problem, a switch compares the traffic utilization of the links of a (virtual) link aggregation with one or more imbalance criteria based on a high and a low threshold, each of which represents a boundary value. In some embodiments, the switch obtains the traffic utilization of a link based on a periodic monitoring of the port bandwidth associated with the link. If a number of links of the link aggregation have higher utilization than the high threshold and a number of links have lower utilization than the low threshold, the switch detects an imbalance of traffic distribution across the links of the link aggregation. The switch then adjusts the traffic distribution across the links by applying one or more corrective actions to the distribution policy so that the traffic utilization becomes more balanced. The switch continues to monitor the traffic distribution and apply these corrective actions until either the traffic distribution becomes acceptably balanced (e.g., the traffic utilization complies with the imbalance criteria) or the number of applied corrective actions reaches a predetermined upper bound. In this way, the switch detects, adjusts, and monitors the imbalance in traffic distribution across the links of the link aggregation.

A partner switch of a virtual link aggregation can receive packets of different traffic flows, which should be forwarded via the virtual link aggregation, from other (e.g., non-partner) switches. These other switches can use a path selection policy to select the respective egress partner switches for the packets. This path selection policy can include a load balancing scheme that determines the overall load of the virtual link aggregation and selects an egress switch for a packet of the traffic flow among the partner switches based on the load. The traffic flow can have different characteristics based on the source media access control (MAC) address, destination MAC address, source Internet Protocol (IP) address, destination IP address, source port, and destination port associated with the traffic flow.

To ensure these other switches are forwarding traffic to the partner switches in a balanced way, a respective partner switches compares the overall traffic utilization of a respective partner switch with one or more switch imbalance criteria based on the high and the low threshold. If a number of partner switches of the virtual link aggregation have higher utilization than the high threshold and a number of partner switches have lower utilization than the low threshold, the partner switch detects an imbalance of traffic distribution across the virtual link aggregation. One of the partner switches, which can be referred to as the designated switch, then instructs the other (non-partner) switches of the network to adjust the traffic distribution across the partner switches by applying one or more corrective actions to the path selection policy. In this way, the overall traffic utilization across the virtual link aggregation becomes more balanced. Furthermore, a respective partner switch also detects, adjusts, and monitors the imbalance in traffic distribution across the local links in the virtual link aggregation.

In some embodiments, the switches participating in a (virtual) link aggregation are member switches of a fabric switch. An end device can be coupled to the fabric switch via a (virtual) link aggregation. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

A fabric switch runs a control plane with automatic configuration capabilities (such as the Fibre Channel control plane) over a conventional transport protocol, thereby allowing a number of switches to be inter-connected to form a single, scalable logical switch without requiring burdensome manual configuration. As a result, one can form a large-scale logical switch using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large fabric switch, which can be viewed and operated as a single switch (e.g., as a single Ethernet switch).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

Although the present disclosure is presented using examples based on link aggregations coupled to networking devices, such as switches, embodiments of the present invention are not limited to networking devices. Embodiments of the present invention are relevant to any technique which allows aggregating a plurality of wired and/or wireless links as a logical link between any devices. In this disclosure, the term "(virtual) link aggregation" is used in a generic sense, and corresponds to a link aggregation, a virtual link aggregation, or both.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a physical or virtual host machine, a conventional switch, or any other type of network device. Additionally, an end device can be coupled to other switches or hosts further away from a network. An end device can also be an aggregation point for a number of switches to enter the network.

The term "switch identifier" refers to a group of bits that can be used to identify a switch. In a layer-2 communication, the switch identifier can be a media access control (MAC) address. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "Packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

The term "switch" is used in a generic sense, and can refer to any standalone switch or switching fabric operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of a "switch" include, but are not limited to, a layer-2 switch, a layer-3 router, or a TRILL RBridge.

Network Architecture of Adaptive Link Aggregation

FIG. 1A illustrates exemplary adaptive link aggregations, in accordance with an embodiment of the present invention. As illustrated in FIG. 1A, switches 102 and 104 in network 100 are coupled to end devices 112 and 114 via adaptive link aggregations 122 and 124, respectively. In some embodiments, network 100 is a fabric switch, and switches 102, 104, and 106 are member switches of the fabric switch. In some further embodiments, a respective switch in the fabric switch is a TRILL RBridge. The fabric switch of network 100 appears as a single logical switch to end devices 112 and 114. The fabric switch of network 100 runs a control plane with automatic configuration capabilities (such as the Fibre Channel control plane) over a conventional transport protocol, thereby allowing a number of switches to be interconnected to form a single, scalable switch without requiring burdensome manual configuration. As a result, network 100 can form a large-scale switch using a number of smaller physical switches (e.g., switches 102, 104, and 106).

Link aggregations 122 and 124 are configured to operate in a special "trunked" mode for end devices 112 and 114, respectively. In some embodiments, link aggregations 122 and 124 respectively operate as a single logical link and appear as one link to end devices 112 and 114. An end device is not required to change the way it is configured for a link aggregation. An end device only needs to be configured to have an aggregate link to a switch. Furthermore, the rest of network 100 (e.g., switch 106) is also not required to be aware that switch 102 and 104 are coupled to end devices 112 and 114, respectively, via respective link aggregations 122 and 124. Therefore, the present invention does not require extra configuration to the rest of network 100.

With existing technologies, switch 104 typically distributes packets of different traffic flows across the links of link aggregation 124 based on the nature of the traffic flows and a distribution policy for link aggregation 124. The nature of the traffic flow indicates the flow identifying information (e.g., the source and destination addresses), content (e.g., specific types of data), and/or type (e.g., unicast or multicast) of the traffic flow. The distribution policy indicates which of links 132 and 134 in link aggregation 124 should be selected for forwarding the packets belonging to a traffic flow of a particular nature. For example, the distribution policy can include a hash function. Upon receiving a packet for end device 114, switch 104 applies the hash function to one or more bytes, which corresponds to one or more fields, of the packet. The output of the hash function indicates which of links 132 and 134 is selected for forwarding the packet.

Typically, the hash function is designed such a way that the distribution of packets of different traffic flows across links 132 and 134 should be statistically even, leading to a statistically even utilization of links 132 and 134. However, depending on the nature of traffic flow and the distribution policy, switch 104 may forward the packets only via link 132. As a result, link 132 can become over-utilized and link 134 remains underutilized, thereby causing imbalance in the distribution of traffic in link aggregation 124. Such imbalance leads to adverse network conditions, such as congestion and packet drops at link 132, and causes reduced performance via link aggregation 124.

Similarly, switch 102 typically distributes packets of different traffic flows across the links of link aggregation 122 based on the nature of the traffic flows and a distribution policy for link aggregation 122. Depending on the nature of the traffic flows and the distribution policy, switch 102 may forward the packets only via links 136 and 138. As a result, links 136 and 138 can become over-utilized and other links in link aggregation 122 remain underutilized, thereby causing imbalance in the distribution of traffic in link aggregation 122. In some embodiments, distribution policies of switch 102 and 104 can be different. Furthermore, even within the same switch, distribution policies can be different for different link aggregations. For example, switch 102 can have a different distribution policy for a link aggregation other than link aggregation 122.

To solve this problem of imbalanced traffic, link aggregations 122 and 124 can adapt to improve the traffic imbalance. During operation, switches 102 and 104 can compare the respective traffic utilizations of the links in their respective link aggregation with one or more imbalance criteria based on a high and a low threshold. Switches 102 and 104 maintain an average traffic utilization of the links in link aggregations 122 and 124, respectively. In some embodiments, the average traffic utilization is calculated based on a weighted average. For example, a weighted average of traffic utilization at a time instance t_c, Avg(t_c), can be calculated based on the measured utilization of a link, U_c, and the weighted average calculated at the previous time instance t_p, Avg(t_p). Here, because a weighted average incorporates the weighted average of the previous time instances, Avg(t_p) represents the historical utilization of the link. t_p can indicate the previous time instance when the previous utilization of the link has been measured. The weighted average calculation can be done based on the formula: $Avg(t\_c)=x*U\_c+(1-x)*Avg(t\_p)$, wherein x is a weight variable with a value between 0 and 1. A value of x greater than 0.5 assigns more weight to the current utilization of the link than the historical utilization.

Switches 102 and 104 compare the weighted averages of the traffic utilizations of the links in their respective link aggregation with the imbalance criteria. For example, switch 104 compares the average traffic utilization of links 132 and 134 with a high and a low threshold. If one of the links, such as link 132, has a higher average utilization than the high threshold, and the other link 134 has a lower average utilization than the low threshold, switch 104 detects an imbalance of traffic distribution across link aggregation 124. Suppose that the high threshold is 0.9 and the low threshold is 0.25. If the average utilization of link 132 is more than 0.9 (i.e., more than 90%) and the average utilization of link 134 is less than 0.25 (i.e., less than 25%), switch 104 detects a traffic distribution imbalance across link aggregation 124.

Even though a link aggregation can remain operational as long as the total traffic is less than the bandwidth offered by the link aggregation, imbalanced bandwidth utilization can lead to adverse network conditions. Hence, the high threshold should be selected in such a way that the condition can be detected before its occurrence. For example, a high threshold less than but close to 1 (e.g., 0.9) may indicate that the link is still operational but may become bottlenecked. Furthermore, because the traffic distribution across the links should be statistically even, the low threshold should be selected such a way that the underutilization of a link is correctly represented. For example, a low threshold higher than 0 but lower than 0.5 (e.g., 0.25) may indicate that the distribution policy is operational but is not distributing the traffic in a statistically balanced way.

In response to detecting an imbalance, switch 104 adjusts the traffic distribution across links 132 and 134 by applying one or more corrective actions to the distribution policy so that the traffic utilization becomes more balanced across link aggregation 124. In some embodiments, the distribution policy is based on a hash function applied to one or more bytes of a received packet. A respective corrective action can adjust how the hash function is applied and may lead to a different output. For example, the corrective action can use a different set of bytes, either by modifying the bits within or by selecting different bytes from the packet, for the hash function. As a result, the traffic distribution across links 132 and 134 changes.

Switch 104 continues to monitor the traffic distribution across links 132 and 134 and apply these corrective actions until either the traffic distribution becomes acceptably balanced or the number of applied corrective actions reaches a predetermined upper bound. For example, switch 104 can continue to apply the corrective actions until the utilizations of link 132 and 134 are not higher than the high threshold or lower than the low threshold. If these conditions are not met after a certain number of corrective actions, as indicated by an upper bound, switch 104 stops applying the corrective actions, and either retains the original settings for the hash function or selects the setting with the least difference between the highest and lowest utilization values of links 132 and 134. Because of the adjustment to the traffic flow, end device 114 can receive packets of a flow via link 132 for a period of time, and then via link 134 for another period of time. In other words, a traffic flow can dynamically move from link to link in a link aggregation without any manual intervention.

In the same way, switch 102 also detects, adjusts, and monitors the imbalance in traffic distribution across link aggregation 122. To detect an imbalance of traffic distribution across link aggregation 122, switch 102 checks whether a number of links of link aggregation 122 have higher utilization than the high threshold and a number of links have lower utilization than the low threshold. Note that this number can be different for the high and the low threshold. If switch 102 detects an imbalance, switch 102 adjusts the traffic distribution across the links of link aggregation 122 by applying corrective actions until either the traffic distribution becomes acceptably balanced or the number of applied corrective actions reaches a predetermined upper bound.

Corrective Actions of Adaptive Link Aggregation

Figure 1B:
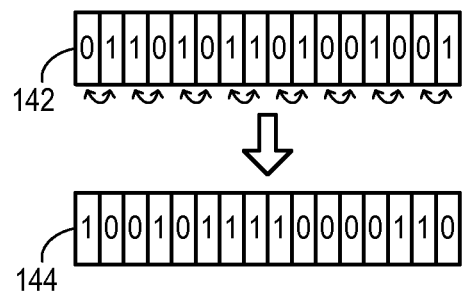
FIG. 1B illustrates an exemplary corrective action for an adaptive link aggregation based on adjacent bit swapping of an hash function input, in accordance with an embodiment of the present invention.

A corrective action can adjust how a hash function of a distribution policy is applied. As a result, the hash function produces a different output and provides a different balance of traffic. The corrective action can be based on changing the input of the hash function, changing the flavor of the hash function, or changing the hash distribution table. FIG. 1B illustrates an exemplary corrective action for an adaptive link aggregation based on adjacent bit swapping of an hash function input, in accordance with an embodiment of the present invention. In this example, hash function input 142 includes two bytes (e.g., 16 bits). In other words, the hash function is applied to the 16 bits of input 142. Input 142 can be one or more fields of a packet. Suppose that input 142 is causing the hash function to operate in an imbalanced way. A corrective action can swap the adjacent bits of input 142 to generate a new input 144. The hash function is then applied to input 144, which can lead to a different and more balanced traffic distribution.

For example, the two least significant bits of input 142 are "01." If these two bits are swapped, two least significant bits of input 144 become "10." Similar bit swapping can be repeated for a respective bit pair of input 142, either from the most significant bit pair or from the least significant bit pair, and generate a modified input 144. In this way, if input 142 comprises the 16-bit long bit string "0110101101001001," based on the adjacent bit swapping, input 144 becomes a different 16-bit long bit string "1001011110000110."

Figure 1C:
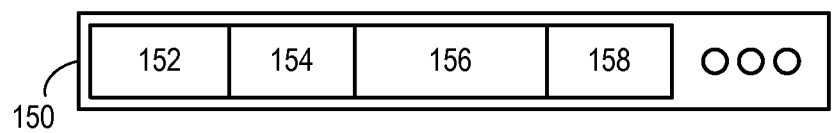
FIG. 1C illustrates an exemplary corrective action for an adaptive link aggregation based on hash flavor adjustment, in accordance with an embodiment of the present invention.

FIG. 1C illustrates an exemplary corrective action for an adaptive link aggregation based on hash flavor adjustment, in accordance with an embodiment of the present invention. In this example, a packet 150 includes fields 152, 154, 156, and 158. The packet shown in FIG. 1C is for illustration purposes only, and is not intended to limit the present invention. In some embodiments, fields 152, 154, 156, and 158 are header fields. Different hash function flavors can be applied to different fields of packet 150. For example, one flavor of the hash function can be applicable to fields 152 and 154, and another flavor of the hash function can be applicable to fields 156 and 158. In some embodiments, a user (e.g., a network administrator) can provide additional information indicating the nature of traffic flow to which packet 150 belongs. For example, the user can indicate whether packet 150 is a layer-3 packet. This can reduce the number of alternative hash function flavors and lead to a more effective selection of a hash function flavor.

In some embodiments, different flavors of a hash function indicate different hash computations. For example, two hash function flavors can be applicable to the same fields 152 and 154, but the hash calculation can be different. Hence, different hash function flavors (e.g., based on different input fields or different hash computations) can generate different output for the same packet header 150. Suppose that the current hash function flavor is causing the hash function to operate in an imbalanced way. A corrective action can change the hash function flavor, which is then applied to one or more fields of packet 150. If one hash function flavor does not generate a balanced traffic distribution, a combination of hash function flavors can be applied, either consecutively or in conjunction with other types of corrective actions. In this way, applying one or more different hash function flavors to header 150 can lead to a different and more balanced traffic distribution.

Figure 1D:
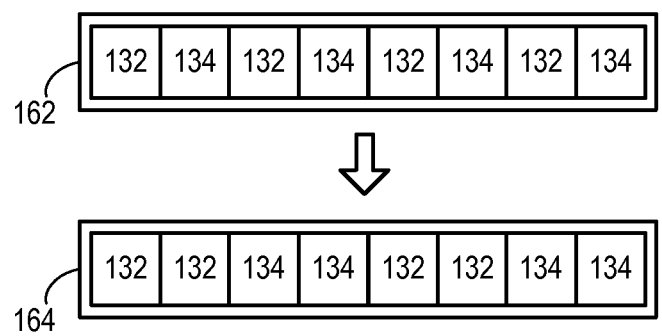
FIG. 1D illustrates an exemplary corrective action for an adaptive link aggregation based on an adjustment of the hash distribution table, in accordance with an embodiment of the present invention.

FIG. 1D illustrates an exemplary corrective action for an adaptive link aggregation based on an adjustment of the hash distribution table, in accordance with an embodiment of the present invention. In this example, a hash distribution table 162 represents the bandwidth ratio or the number of active links in a link aggregation. A respective slot in hash distribution table 162 is associated with a link of a link aggregation. For example, for link aggregation 124 in FIG. 1A, a respective of eight slots of hash distribution table 162 is associated with either link 132 or 134. If hash distribution table 162 represents the number of active links of link aggregation 124, four slots are associated with link 132 and another four slots are associated with link 134. In this example, hash distribution table 162 is periodic in nature (e.g., the same pattern of slow association is repeated in hash distribution table 162). Slots of hash distribution table 162 are distributed among links 132 and 134 alternatively (e.g., the first slot is associated with link 132, the second slot is associated with link 134, and so on).

In some embodiments, the length (e.g., the number of slots or entries) of hash distribution table 162 is predetermined. For example, the number of slots of hash distribution table 162 can be predetermined to be eight. Hence, when hash distribution table 162 is representing link aggregation 122, the eight slots of hash distribution table 162 are associated with the links of link aggregation 122 based on the number of active links or the bandwidth ratio. If hash distribution table 162 represents the number of active links of link aggregation 122, two slots are associated with link 136 and another two slots are associated with link 138. Similarly, each of the other two links of link aggregation 122 is associated with two slots of hash distribution table 162, respectively.

In some embodiments, a modulo function is applied to the output of the hash function to generate an index for hash distribution table 162. This modulo function is based on the length of a hash distribution table (e.g., modulo 8 for hash distribution table 162). Suppose that switch 104 applies the hash function to a packet and the modulo function to the output of the hash function for generating an index. If the index corresponds to the first slot of hash distribution table 162, switch 104 forwards the packet via link 132. Suppose that the modulo function applied to the output of the hash function is generating indices of hash distribution table 162 in an imbalanced way. Hash distribution table 162 then can be adjusted to associate a slot with a link in a different way and generate a different hash distribution table 164.

Unlike the alternative association between a respective slot of hash distribution table 162 with links 132 and 134, two adjacent slots are associated with link 132, the next two adjacent slots are associated with link 134 in hash distribution table 164, and so on. This allows the same modulo function applied on the same hash function to correspond to a different link. Suppose that switch 104 applies the hash function to a packet and the modulo function to the output of the hash function to generate an index. If hash distribution table 162 is used and the index corresponds to the second slot, switch 104 forwards the packet via link 134. However, if hash distribution table 16 is used and the index corresponds to the second slot, switch 104 forwards the packet via link 132. In this way, adjusting the hash distribution table can lead to a different and more balanced traffic distribution.

In some embodiments, the length of the hash distribution table for a link aggregation is 64 (i.e., the hash distribution table has 64 slots). Consequently, the number of possible permutations of the adjustment of the hash distribution table can be large. In some embodiments, a predetermined number of random irregular permutations of these possible permutations are selected for the adjustment of a hash distribution table. This allows the corrective actions to be time bounded.

Processes of an Adaptive Link Aggregation

Figure 2A:
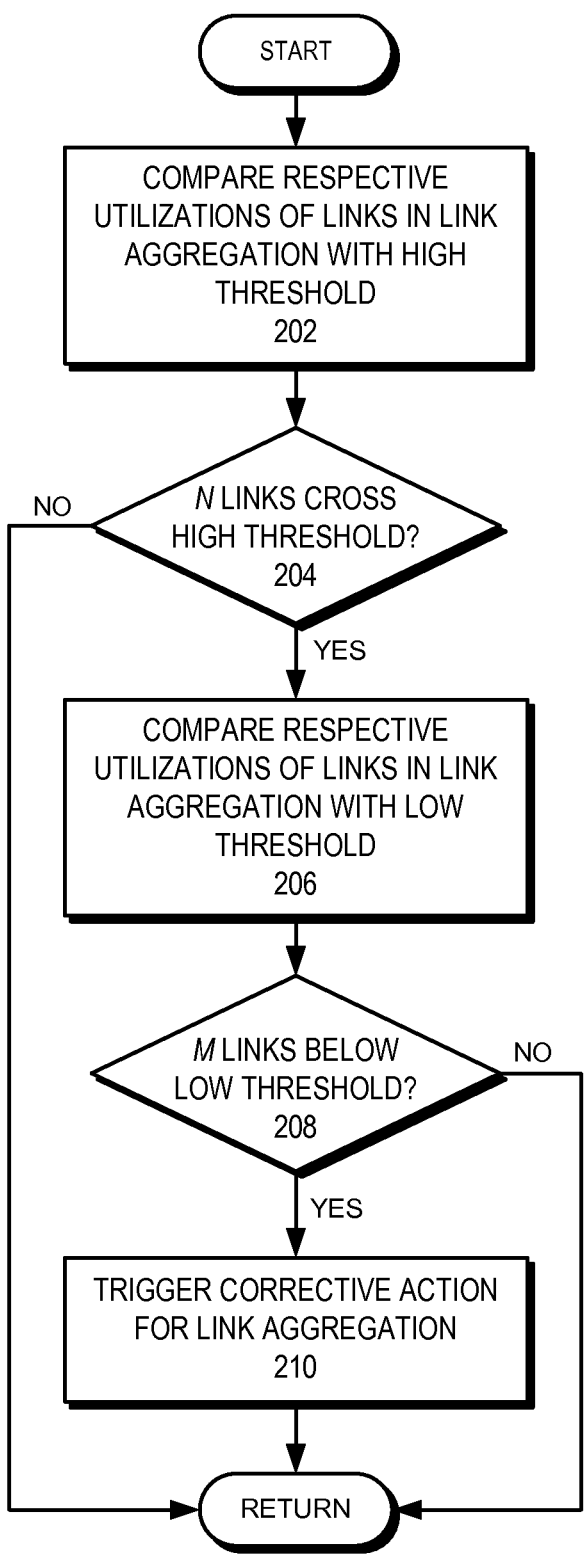
FIG. 2A presents a flowchart illustrating the process of a switch detecting a link utilization imbalance in an adaptive link aggregation, in accordance with an embodiment of the present invention.

FIG. 2A presents a flowchart illustrating the process of a switch detecting a link utilization imbalance in an adaptive link aggregation, in accordance with an embodiment of the present invention. During operation, the switch compares the respective utilizations of the links in the link aggregation with the high threshold (operation 202). Exemplary representations of the utilization of a link include, but are not limited to, fraction of the link bandwidth used, traffic load on the link, residual bandwidth of the link, latency via the link, and a combination thereof. The switch then checks whether N links cross the high threshold (i.e., at least N links have higher utilization than the high threshold) (operation 204). Here, N indicates the minimum number of links with utilization higher than the high threshold that triggers corrective actions for the link aggregation.

If N links cross the high threshold, the switch compares the respective utilizations of the links in the link aggregation with the low threshold (operation 206). The switch then checks whether M links are below the low threshold (i.e., at least M links have lower utilization than the low threshold) (operation 208). Here, M indicates the minimum number of links with utilization lower than the low threshold that triggers corrective actions for the link aggregation. The values for M and N can be the same or different. In some embodiments, respective values of M and N can be different for a respective link aggregation. If M links are below the low threshold, the switch triggers corrective actions for the link aggregation (operation 210), as described in conjunction with FIG. 1A.

Figure 2B:
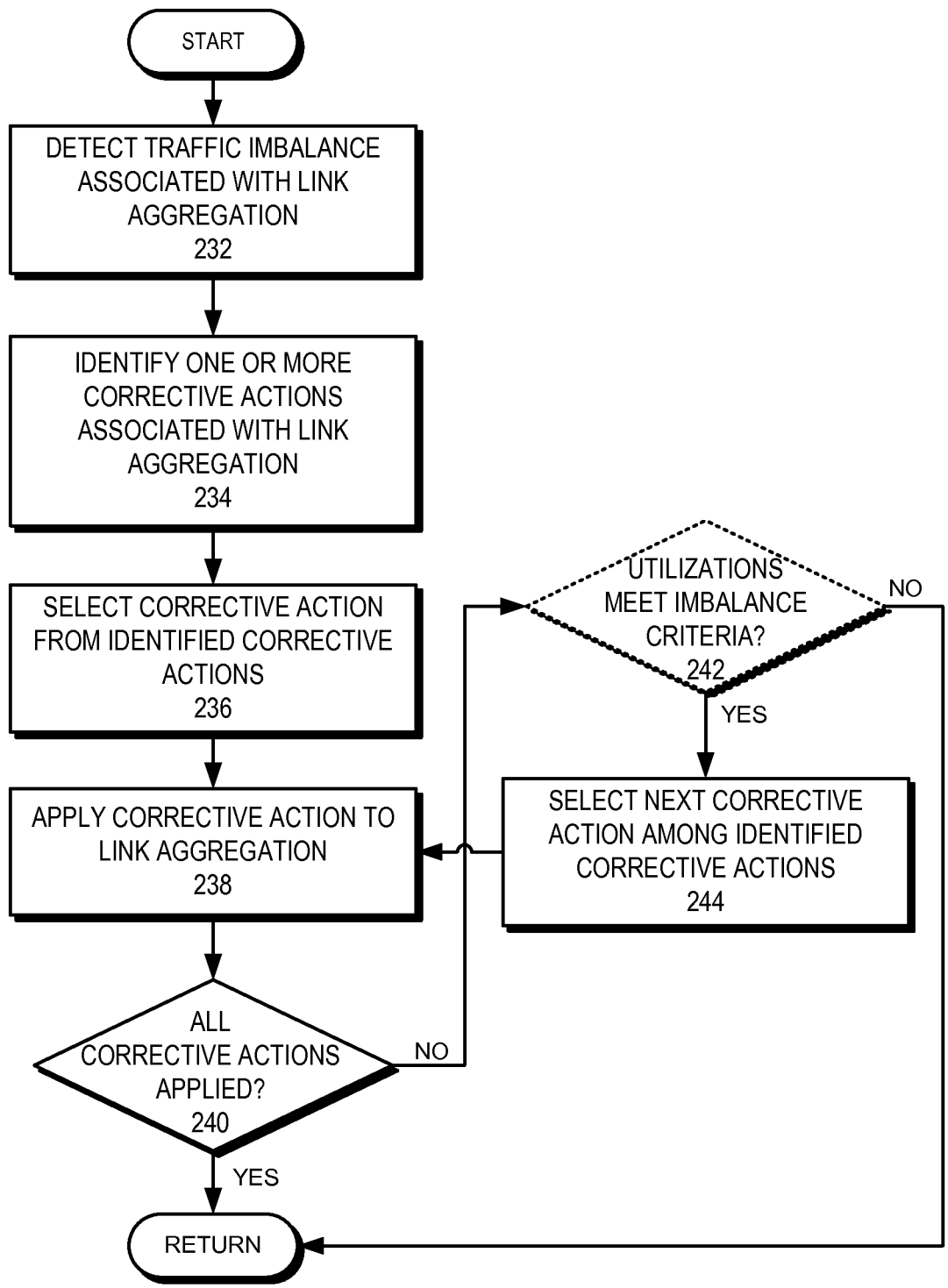
FIG. 2B presents a flowchart illustrating the process of a switch applying corrective actions for adjusting link utilizations of an adaptive link aggregation, in accordance with an embodiment of the present invention.

FIG. 2B presents a flowchart illustrating the process of a switch applying corrective actions for adjusting link utilizations of an adaptive link aggregation, in accordance with an embodiment of the present invention. During operation, the switch detects a traffic imbalance associated with the link aggregation (operation 232), as described in conjunction with FIG. 2A. The switch identifies one or more corrective actions associated with the link aggregation (operation 234), as described in conjunction with FIGS. 1B-1D. In some embodiments, the number of corrective actions applicable to the link aggregation has an upper bound. The switch then selects a corrective action from the identified corrective actions (operation 238). The switch can repetitively select the same corrective action or select a combination of corrective actions. The switch applies the selected corrective action to the link aggregation (operation 238). The switch checks whether all corrective actions associated with the link aggregation have been applied (operation 240).

If all corrective actions associated with the link aggregation have not been applied, in some embodiments, the switch optionally checks (denoted with dotted lines) whether the utilizations meet the imbalance criteria (i.e., a number of links have higher utilization than the high threshold and a number of links have lower threshold than the low threshold) (operation 242). If optional operation 242 is not executed or the utilization continues to meet the imbalance criteria (operation 242), the switch selects the next corrective action from the identified corrective actions (operation 244) and continues to apply the selected corrective action to the link aggregation (operation 238). The selection of corrective actions and/or the order at which the corrective actions are applied can be statically configured by a user or dynamically determined by the switch. In some embodiments, the selection of corrective actions and/or the order at which the corrective actions are different for different link aggregations of the switch.

Figure 2C:
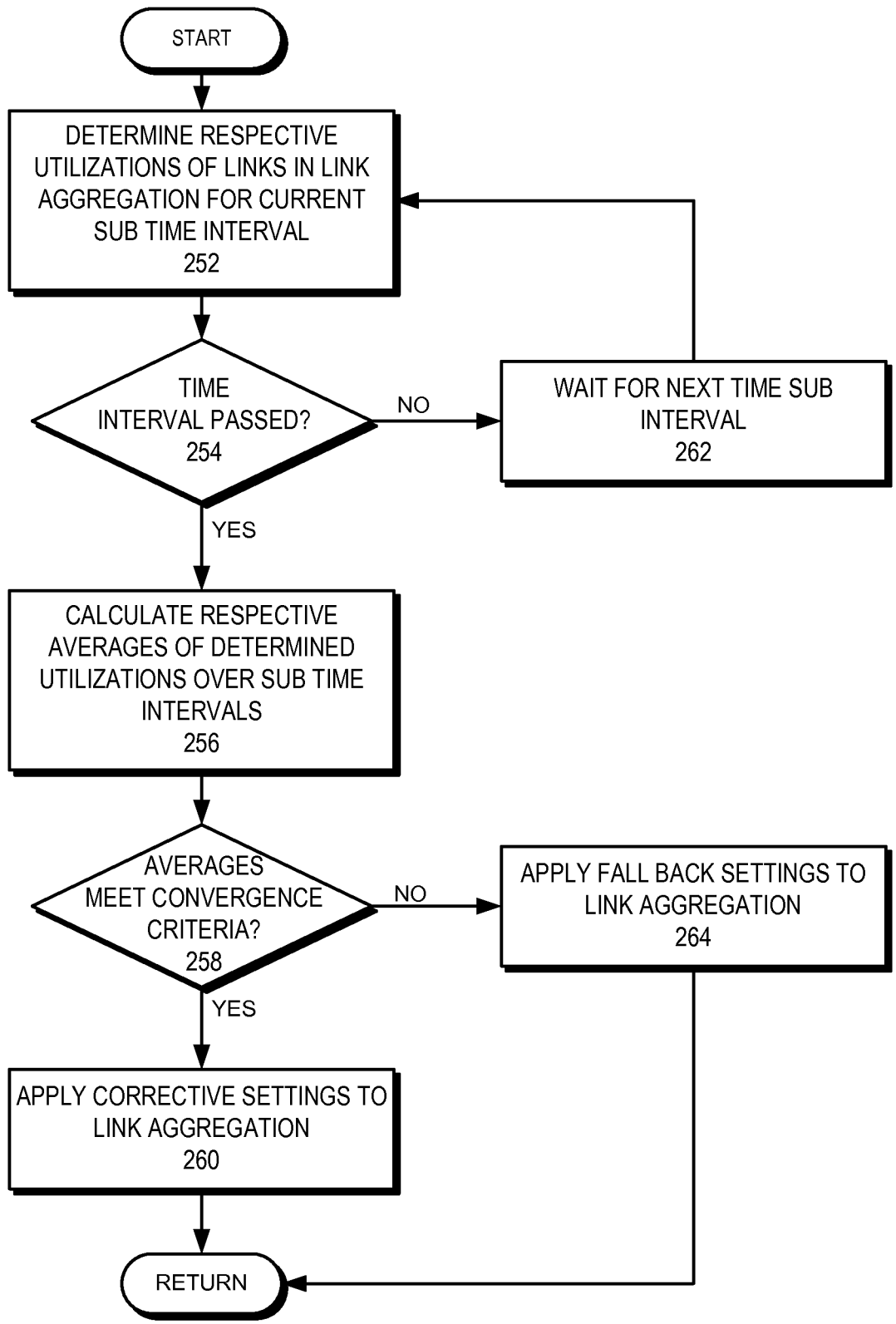
FIG. 2C presents a flowchart illustrating the process of a switch monitoring link utilizations of an adaptive link aggregation, in accordance with an embodiment of the present invention.

FIG. 2C presents a flowchart illustrating the process of a switch monitoring link utilizations of an adaptive link aggregation, in accordance with an embodiment of the present invention. This monitoring process is done over a time interval. In some embodiments, the time interval is divided into sub time intervals and the utilization is determined in a respective sub interval. At the end of the time interval, the switch calculates the average, which can be an arithmetic or weighted average, of the determined utilization over the sub intervals. In some embodiments, the time interval is 10 seconds and a respective sub time interval is 1 second. During operation, the switch determines respective utilizations of links in the link aggregation for the current sub time interval (operation 252) and checks whether the time interval has passed (operation 254). If the time interval has not passed, the switch waits for the next sub time interval (operation 262) and determines respective utilizations of links in the link aggregation for that sub time interval (operation 252).

If the time interval has passed, the switch calculates the respective averages of the determined utilizations over the sub time intervals (operation 256) and checks whether the averages meet the convergence criteria (operation 258). In some embodiments, the convergence criteria includes whether the average utilizations across the link aggregation are better balanced and whether the average utilizations comply with the imbalance criteria, as described in conjunction with FIG. 2A. If the averages meet the convergence criteria, the switch applies the corrective settings (e.g., the current hash function input and flavor, and the hash distribution table) to the link aggregation (operation 260). If the averages do not meet the convergence criteria, the switch applies the fallback settings to the link aggregation (operation 262). Examples of the fallback settings include, but are not limited to, the original settings during the detection process and the settings with the least difference between the highest and lowest utilizations.

Network Architecture of Adaptive Virtual Link Aggregation

Figure 3A:
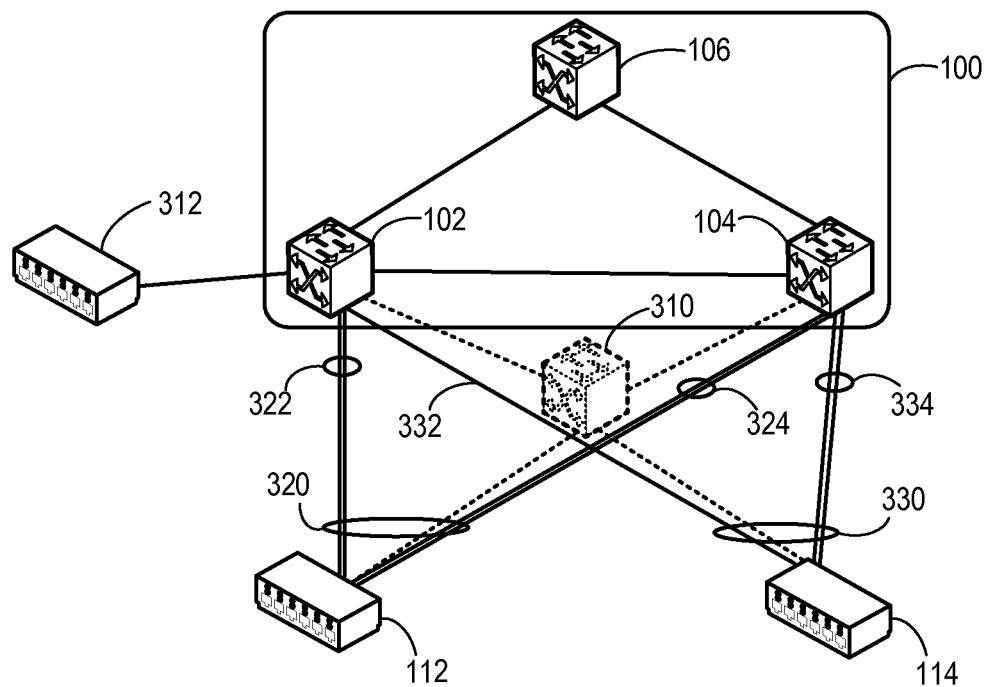
FIG. 3A illustrates exemplary adaptive virtual link aggregations, in accordance with an embodiment of the present invention.

FIG. 3A illustrates exemplary adaptive virtual link aggregations, in accordance with an embodiment of the present invention. In this example, switches 102 and 104 in network 100 are coupled to end devices 112 and 114 via virtual link aggregations 320 and 330, respectively. Here, switches 102 and 104 are partner switches of virtual link aggregations 320 and 330. In some embodiments, network 100 is a fabric switch, and switches 102, 104, and 106 are member switches of the fabric switch. Virtual link aggregation 320 includes link aggregations 322 and 324, and virtual link aggregation 330 includes link 332 and link aggregation 334. Hence, a virtual link aggregation can be formed based on link aggregations and individual links. Note that link aggregations 322, 324, and 334 can operate as trunked links between two devices, as described in conjunction with FIG. 1A.

Virtual link aggregations 320 and 330 are configured to operate in a special "trunked" mode for end devices 112 and 114, respectively. End devices 112 and 114 view switches 102 and 104 as a common virtual switch 310, with a corresponding virtual switch identifier. Dual-homed end devices 112 and 114, which are coupled to more than one switches, are considered to be logically coupled to virtual switch 310 via logical links represented by dotted lines. Virtual switch 310 is considered to be logically coupled to both switches 102 and 104, optionally with zero-cost links (also represented by dotted lines). Incoming frames from end devices 112 and 114 are marked with virtual switch 310's identifier as their ingress switch identifier. As a result, other switches in network 100 (e.g., switch 106) learn that end devices 112 and 114 are both reachable via virtual switch 310. Furthermore, switches 102 and 104 can advertise their respective connectivity (optionally via zero-cost links) to virtual switch 310. Hence, multi-pathing can be achieved when other switches, such as switch 106, choose to send frames to virtual switch 310 (which are marked as the egress switch in the frames) via switches 102 and 104.

Since the two partner switches function as a single logical switch, the MAC address reachability learned by a respective partner switch is shared with the other partner switch. For example, during normal operation, end device 112 may choose to send its outgoing frames only via the link to switch 102. As a result, only switch 102 would learn end device 112's MAC address (and the corresponding port on switch 102 to which end station 112 is coupled). Switch 102 then shares this information with switch 104. Since the frames coming from end device 112 would have virtual switch 310's identifier as their ingress switch identifier, when other devices in the network send frames back to end device 112, these frames would have virtual switch 310's identifier as their egress switch identifier, and these frames might be sent to either switch 102 or 104. When switch 104 receives such a frame, it can determine that this frame can either be sent to locally coupled end device 112 or partner switch 102, based on the MAC reachability information shared by switch 102.

It should be noted that virtual switch 310 is not specific to a particular set of virtual link aggregation. In other words, both dual-homed end devices 112 and 114 can share the same virtual switch 310. This feature makes the present solution scalable, because a number of dual-homed end devices can be logically attached to the same virtual switch.

In addition, an end device is not required to change the way it is configured for a link aggregation. A dual-homed end device only needs to be configured to have an aggregate link to the virtual switch, as would be the case with a conventional, physical switch, using an existing link aggregation method. Hence, the dual-homed end device does not need to be aware that the virtual switch on the other end of the aggregate link is actually two physical switches. Furthermore, the rest of network 100 (apart from switches 102 and 104) is also not required to be aware that virtual switch 310 is actually not a physical switch. For example, to switch 106, virtual switch 310 can be indistinguishable from any of the physical switches. Therefore, the present invention does not require extra configuration to the rest of network 100.

The packets of different traffic flows toward end devices 112 and 114 can be distributed across partner switches 102 and 104. As a result, an imbalance of traffic can occur across partner switches 102 and 104, as well as the respective links in link aggregations 322, 324, and 334. For example, depending on the nature of traffic flow and a path selection policy, switch 106 may forward the packets toward end device 112 only via only one of the partner switches, such as switch 102, of virtual link aggregation 320. Consequently, switch 102's links in virtual link aggregation 320 can become over-utilized and switch 104's links in virtual link aggregation 320 remain underutilized. Furthermore, an imbalance can also occur among the links of link aggregation 322, which are switch 102's links in virtual link aggregation 320. This can cause a multi-tier imbalance in virtual link aggregation 320.

To solve this problem, switch 102 compares the traffic utilization of switches 102 and 104 for virtual link aggregation with one or more switch imbalance criteria based on a high and a low threshold. During operation, switch 102 receives packets of different traffic flows, which should be forwarded via virtual link aggregation 320, from an ingress (and non-partner) switch 106. Switch 106 can use a path selection policy to select switch 102 as the egress partner switch for the packets. The path selection policy allows a switch in network 100 to select a path among multiple paths to a switch. For example, switch 106 perceives that switch 106 has two paths to virtual switch 310 via switch 102 or 104, and uses the path selection policy to determine which path to select for forwarding toward virtual switch 110. In some embodiments, a user (e.g., a network administrator) can provide additional information indicating the nature of traffic flow to which a packet belongs. For example, the user can indicate whether the packet is a non-IP packet, and what type of upper-layer protocol (e.g., Transmission Control Protocol (TCP) or User Datagram Protocol (UDP)) is in the payload of the packet. This can reduce the solution space for the path selection policy.

To ensure that switch 106 is forwarding traffic to partner switches 102 and 104 in a balanced way, partner switches 102 and 104 compare the traffic utilization of a respective partner switch of virtual link aggregation 320 with the switch imbalance criteria. If switch 102 has a higher utilization than the high threshold and switch 104 has a lower utilization than the low threshold, switches 102 and 104 detect an imbalance of traffic distribution across switches 102 and 104 for virtual link aggregation 320. Note that the thresholds for the imbalance criteria and the switch imbalance criteria can be the same or different. One of the partner switches of virtual link aggregation 320, which can be referred to as the designated switch, then instructs the other switches, such as switch 106, of network 100 to adjust the traffic distribution across partner switches 102 and 104 by applying one or more corrective actions, as described in conjunction with FIGS. 1B-1D, to the path selection policy so that the traffic utilization becomes more balanced.

Furthermore, switches 102 and 104 also detect, adjust, and monitor the imbalance in traffic distribution across the local links in virtual link aggregation 320. For example, if link aggregation 322 has an imbalance, switch 102 detects, adjusts, and monitors the imbalance, as described in conjunction with FIGS. 2A-2C. In some embodiments, the designated switch instructs one ingress switch at a time to adjust the traffic distribution for the virtual link aggregation. The designated switch then monitors the virtual link aggregation for improvements. If no improvement is monitored, the designated switch instructs another ingress switch to adjust traffic distribution. In some further embodiments, the adjustment to traffic distribution for a virtual link aggregation is done independently by a respective ingress switch (as opposed to being coordinated by the designated switch).

In some embodiments, switches 102 and 104 are aware of locally switched traffic when detecting the imbalance for virtual link aggregation 320. In some embodiments, switches 102 and 104 use access control lists (ACLs) (e.g., based on counting egress ACL in hardware or software) to determine the percentage of locally switched traffic. Suppose that an end device 312 is coupled to switch 102 and is sending packets toward end device 112. These packets are locally switched at switch 102 and forwarded via link aggregation 322. These packets typically do not use non-local links of virtual link aggregation 320 (e.g., links in link aggregation 324). Hence, these packets may cause switches 102 and 104 to incorrectly detect an imbalance in virtual link aggregation 320. Awareness of locally switched traffic can mitigate this effect. For example, switch 102 can exclude the bandwidth used by these packets when calculating the utilization of links in link aggregation 322. Furthermore, the designated switch of virtual link aggregation 320 can exclude the bandwidth used by these packets when notifying ingress switches, such as switch 106, regarding the available bandwidth for traffic from the remote switches.

Figure 3B:
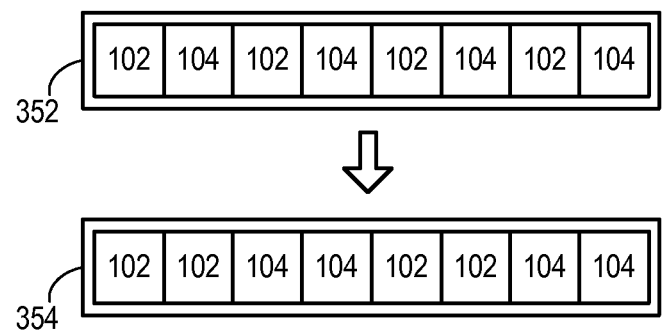
FIG. 3B illustrates an exemplary corrective action for an adaptive virtual link aggregation based on an adjustment of the egress switch distribution table, in accordance with an embodiment of the present invention.

FIG. 3B illustrates an exemplary corrective action for an adaptive virtual link aggregation based on an adjustment of the egress switch distribution table, in accordance with an embodiment of the present invention. In this example, an egress switch distribution table 352 represents the bandwidth ratio or the number of active links of a respective partner switch of a virtual link aggregation. A respective slot in egress switch distribution table 352 is associated with a partner switch of a virtual link aggregation. For example, for virtual link aggregation 320 in FIG. 3A, a respective of eight slots of egress switch distribution table 352 is associated with either switch 102 or 104. In the example in FIG. 3A, the number of active links of switches 102 and 104 in virtual link aggregation 320 are two and two, respectively. Hence, if egress switch distribution table 352 represents the number of active links of a respective partner switch of virtual link aggregation 320, the eight slots of egress switch distribution table 352 are distributed equally to switches 102 and 104. So, four slots of egress switch distribution table 352 are associated with switch 102 and another four slots are associated with switch 104. In this example, egress switch distribution table 352 is periodic in nature. Slots of egress switch distribution table 352 are distributed among switches 102 and 104 alternatively (e.g., the first slot is associated with switch 102, the second slot is associated with switch 104, and so on).

In some embodiments, the length (e.g., the number of slots or entries) of egress switch distribution table 352 is predetermined. For example, the number of slots of egress switch distribution table 352 can be predetermined to be eight. Hence, when egress switch distribution table 352 is representing virtual link aggregation 320, the eight slots of egress switch distribution table 352 are associated with partner switches of virtual link aggregation 320. In some embodiments, to forward a packet toward end device 112, switch 106 applies a hash function on one or more fields of the packet. Switch 106 can also apply a modulo function (e.g., modulo 8 for egress switch distribution table 352) to the output of the hash function to generate an index for egress switch distribution table 352.

Suppose that switch 106 applies the hash function to a packet and the modulo function to the output of the hash function for generating an index. If the index corresponds to the first slot of egress switch distribution table 352, switch 106 forwards the packet via switch 102. Suppose that the modulo function applied to the output of the hash function is generating indices of egress switch distribution table 352 in an imbalanced way. Egress switch distribution table 352 then can be adjusted to associate a slot with a link in a different way and generate a different egress switch distribution table 354.

Unlike the alternative association between a respective slot of egress switch distribution table 352 with switches 102 and 104, two adjacent slots are associated with switch 102, the next two adjacent slots are associated with switch 104 in egress switch distribution table 352, and so on. This allows the same modulo function applied on the same hash function to correspond to a different link. Suppose that switch 106 applies the hash function to a packet and the modulo function to the output of the hash function for generating an index. If egress switch distribution table 352 is used and the index corresponds to the second slot, switch 106 forwards the packet toward switch 102. However, if egress switch distribution table 354 and the index corresponds to the second slot, switch 106 forwards the packet toward switch 104. In this way, adjusting the egress switch distribution table can lead to a different and more balanced traffic distribution across the partner switches of a virtual link aggregation.

In some embodiments, the length of the egress switch distribution table for a link aggregation is 16 (i.e., the egress switch distribution table has 16 slots). Consequently, the number of possible permutations of the adjustment of the egress switch distribution table can be large. In some embodiments, a predetermined number of random irregular permutations of these possible permutations are selected for the adjustment of an egress switch distribution table. This allows the corrective actions to be time bounded.

Processes of an Adaptive Virtual Link Aggregation

Figure 4A:
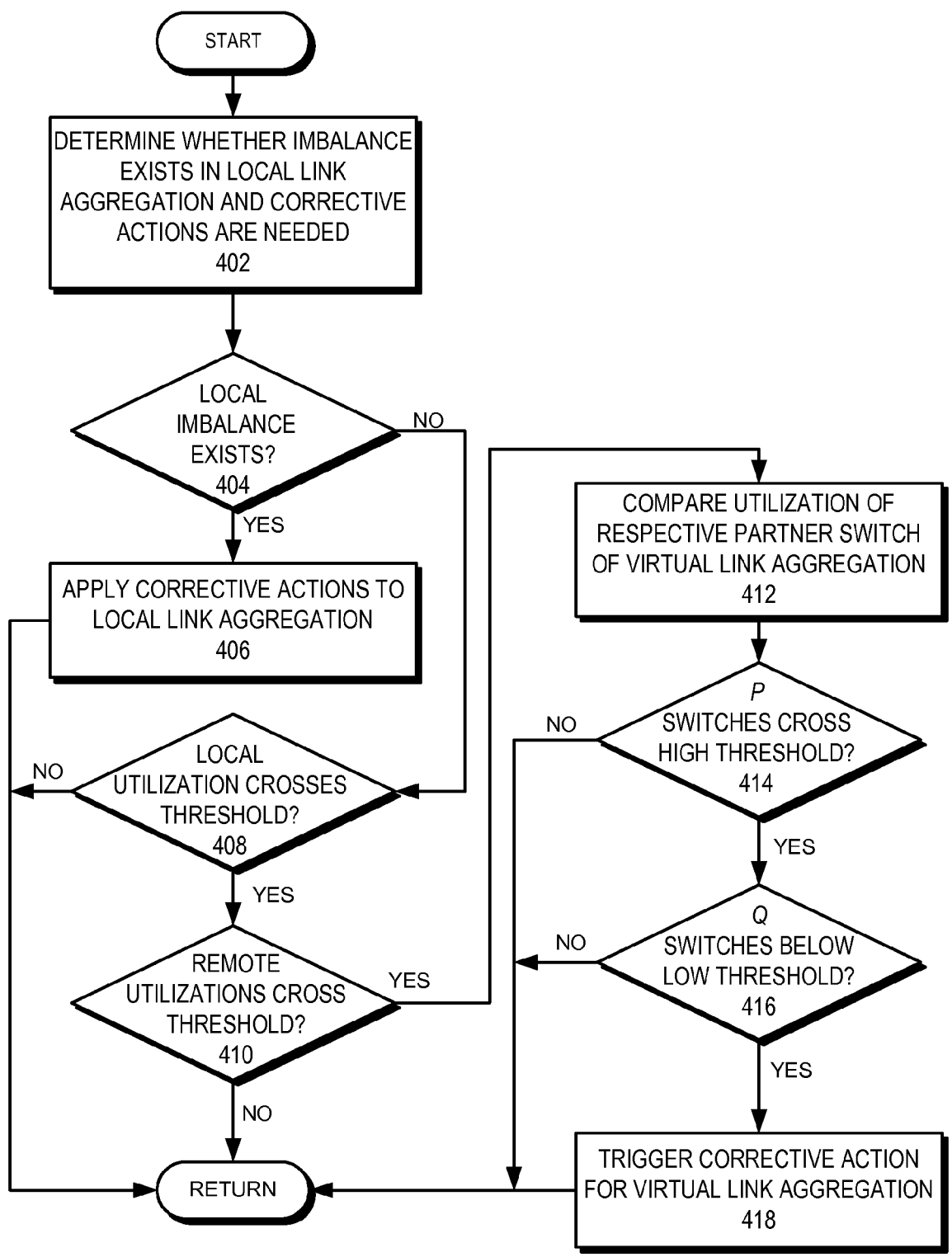
FIG. 4A presents a flowchart illustrating the process of a partner switch detecting a link utilization imbalance in an adaptive virtual link aggregation, in accordance with an embodiment of the present invention.

FIG. 4A presents a flowchart illustrating the process of a partner switch detecting a link utilization imbalance in an adaptive virtual link aggregation, in accordance with an embodiment of the present invention. During operation, the switch determines whether an imbalance exists in local link aggregation and corrective actions are needed (operation 402), as described in conjunction with FIG. 2A. A local link aggregation is locally coupled to a switch and based on the local ports of a switch. In the example in FIG. 3A, virtual link aggregation 320 includes link aggregation 322, which is local to switch 102, and link aggregation 324, which is local to switch 104. Based on the determination, the switch checks whether a local imbalance (i.e., a traffic imbalance across the links of a local link aggregation in the virtual link aggregation) exists (operation 404).

If a local imbalance exists, the switch applies corrective actions to the local link aggregation (operation 406), as described in conjunction with FIG. 2B. If a local imbalance does not exist, the switch checks whether the overall utilization (e.g., utilization across all of its local links in the virtual link aggregation) crosses a threshold (operation 408). If the overall utilization is greater than the threshold, the switch checks whether the remote utilizations cross the threshold (operation 410). Remote utilizations indicate the respective overall utilization of other partner switches. If the remote utilizations cross the threshold, the switch compares the utilization of a respective partner switch of the virtual link aggregation (operation 412). The switch then checks whether the utilization of P switches crosses a high threshold (i.e., at least P switches have higher overall utilization than the high threshold) (operation 414).

If the utilization of P switches crosses the high threshold, the switch then checks whether utilization of Q switches is below a low threshold (i.e., at least Q switches have lower overall utilization than the low threshold) (operation 416). If utilization of Q switches is below the low threshold, the switch triggers corrective action for the virtual link aggregation (operation 418). The values of this high and low threshold can be different from the values of the high and low thresholds in FIG. 2A. Here, P indicates the minimum number of switches with overall utilization higher than the high threshold that triggers corrective actions for the virtual link aggregation. Similarly, Q indicates the minimum number of switches with overall utilization lower than the low threshold that triggers corrective actions for the link aggregation. The values for P and Q can be the same or different. In some embodiments, respective values of P and Q can be different for a respective virtual link aggregation. Furthermore, the values P and Q can be difficult from the values of M and N in FIG. 2A.

Figure 4B:
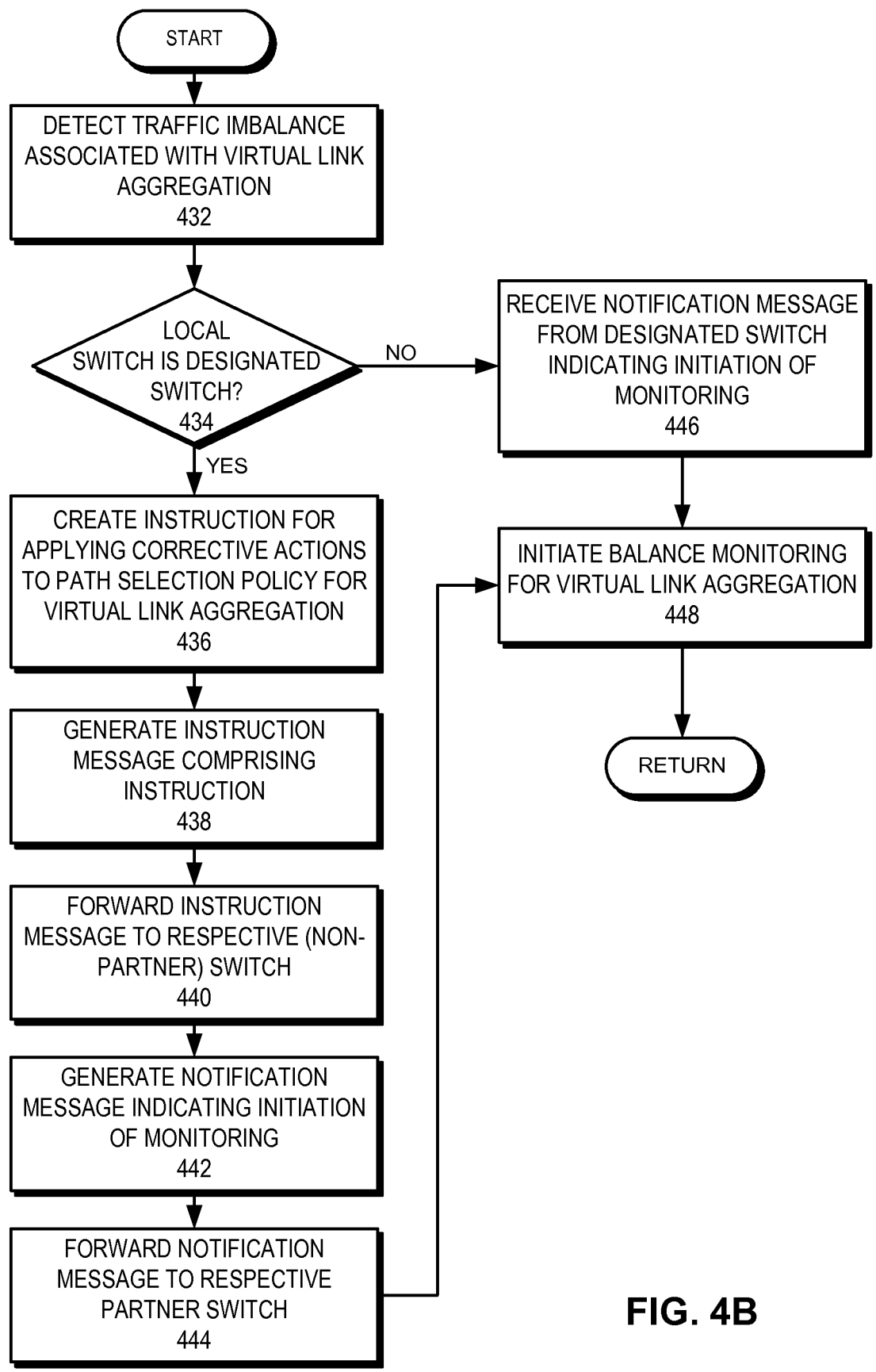
FIG. 4B presents a flowchart illustrating the process of a partner switch applying corrective actions for adjusting link utilizations of an adaptive virtual link aggregation, in accordance with an embodiment of the present invention.

FIG. 4B presents a flowchart illustrating the process of a partner switch applying corrective actions for adjusting link utilizations of an adaptive virtual link aggregation, in accordance with an embodiment of the present invention. During operation, the switch detects a traffic imbalance associated with the virtual link aggregation (operation 432), as described in conjunction with FIG. 4A. The switch then checks whether the local switch is the designated switch (operation 434). The designated switch is responsible for instructing other switches in the network to apply corrective actions to their respective path selection policy for the virtual link aggregation. If the local switch is not the designated switch, the switch is another partner switch of the link aggregation. The switch then receives a notification message from the designated switch indicating the initiation of monitoring (operation 446). In response, the switch initiates balance monitoring for the virtual link aggregation (operation 448). The switch monitors the effects of the corrective actions during this balance monitoring.

If the local switch is the designated switch, the switch creates an instruction for applying corrective actions to the path selection policy for the virtual link aggregation (operation 436). Other switches of the network can use a path selection policy to select the respective egress partner switches for the packets which should be forwarded via the virtual link aggregation. This path selection policy can include a load balancing scheme that determines the overall load of the virtual link aggregation and selects an egress switch for a packet among the partner switches based on the load. The traffic flow can have different characteristics based on the source MAC address, destination MAC address, source IP address, destination IP address, source port, and destination port associated with the traffic flow. In some embodiments, this instruction can include one or more corrective actions which should be applied to the path selection policy. The instruction can also include the order at which the corrective actions should be applied. This instruction can be periodic, wherein the designated switch includes the corrective actions in the instruction based on the overall utilization of the switches during that period.

The switch then generates an instruction message comprising the instruction (operation 438) and forwards the instruction message to respective switch of the network (operation 440). In some embodiments, the switch forwards the message only toward the non-partner switches of the virtual link aggregation (e.g., switch 106 in the example in FIG. 3A). The switch also generates a notification message indicating the initiation of monitoring (operation 442). This notification message can include an instruction for the partner switches to initiate the balance monitoring. The switch then forwards the notification message to a respective partner switch (operation 444) and initiates balance monitoring for the virtual link aggregation (operation 448).

Figure 4C:
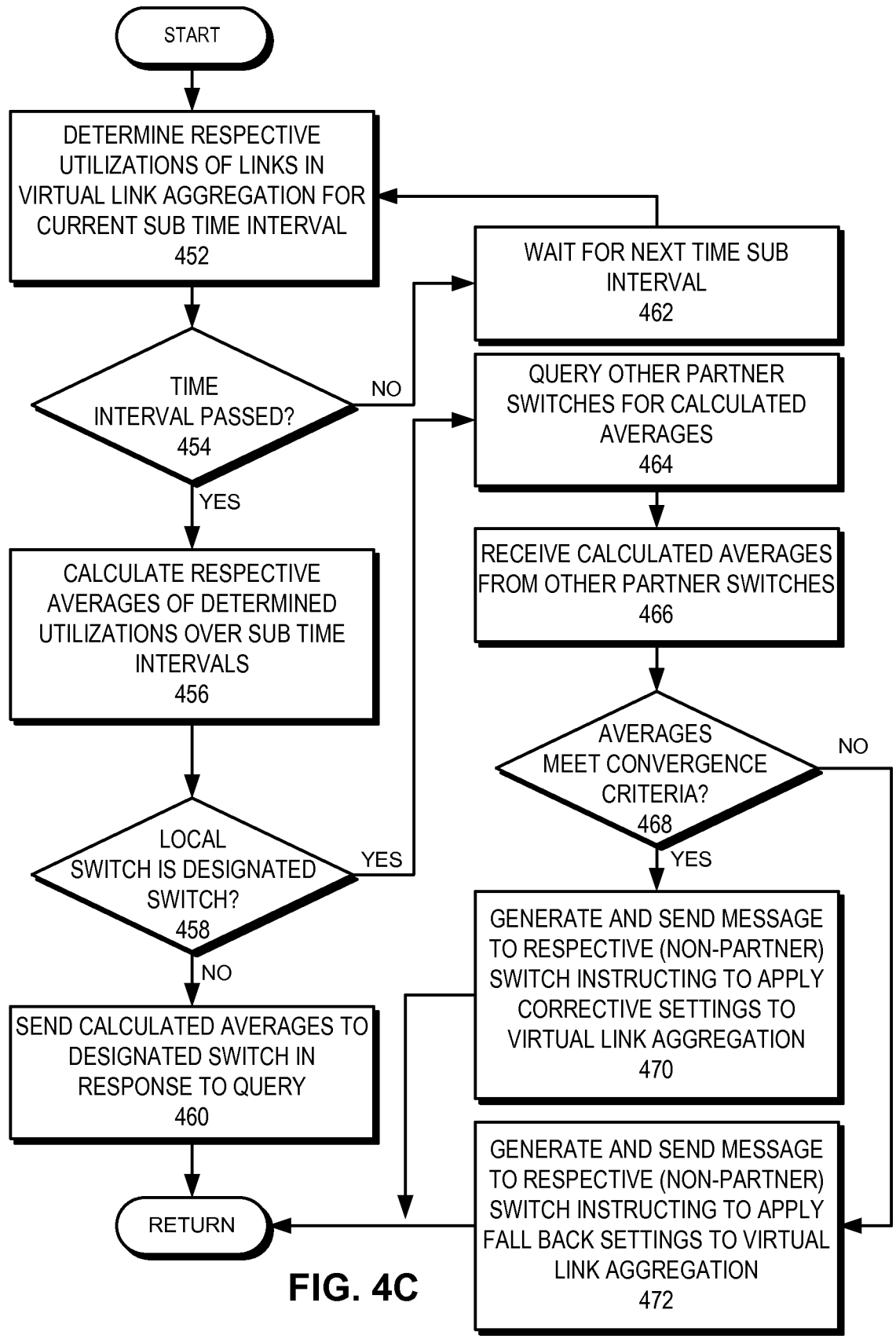
FIG. 4C presents a flowchart illustrating the process of a partner switch monitoring a link utilization imbalance in an adaptive virtual link aggregation, in accordance with an embodiment of the present invention.

FIG. 4C presents a flowchart illustrating the process of a partner switch monitoring link utilizations of an adaptive virtual link aggregation, in accordance with an embodiment of the present invention. This monitoring process is done over a time interval. In some embodiments, the time interval is divided into sub time intervals and the utilization is determined in a respective sub interval. At the end of the time interval, the switch calculates the average, which can be an arithmetic or weighted average, of the determined utilization over the sub intervals. In some embodiments, the time interval for a virtual link aggregation is ten times than the time interval for a link aggregation, and a respective sub time interval is 1 second. In some further embodiments, the time interval for a virtual link aggregation is reduced. This is because any local balancing of link aggregations, prior to the balancing of virtual link aggregation, can lead to a suitable setting (e.g., a suitable hashing flavor). Furthermore, the balancing of virtual link aggregation does not change the nature of the traffic, hence, may not introduce significant local imbalance.

During operation, the switch determines respective utilizations of links in the virtual link aggregation for the current sub time interval (operation 452) and checks whether the time interval has passed (operation 454). If the time interval has not passed, the switch waits for the next sub time interval (operation 462) and determines respective utilizations of links in the virtual link aggregation for that sub time interval (operation 452). If the time interval has passed, the switch calculates the respective averages of the determined utilizations over the sub time intervals (operation 456) and checks whether the local switch is the designated switch (operation 458).

If the local switch is the designated switch, the switch queries other partner switches of the virtual link aggregation for their respective calculated averages (operation 464). On the other hand, if the local switch is not the designated switch, the switch sends the calculated averages to the designated switch in response to the query from the designated switch (operation 460). If the local switch is the designated switch, upon querying the partner switches (operation 464), the switch receives the calculated averages from other partner switches of the virtual link aggregation (operation 466) and checks whether the averages meet the convergence criteria (operation 468). In some embodiments, the convergence criteria includes whether the average utilizations across the link aggregation are better balanced and whether the average utilizations comply with the imbalance criteria, as described in conjunction with FIG. 2A.

If the averages meet the convergence criteria, the switch generates and sends a message to a respective switch instructing to apply the corrective settings to the virtual link aggregation (e.g., the current hash function input and flavor for the path selection policy, and the egress switch distribution table) (operation 470). In some embodiments, the message is only sent to the non-partner switches of the virtual link aggregation. If the averages do not meet the convergence criteria, the switch generates and sends a message to a respective (non-partner) switch instructing to apply the fallback settings to the virtual link aggregation (operation 472). Examples of the fallback settings include, but are not limited to, the original settings during the detection process and the settings with the least difference between the highest and lowest utilizations.

Exemplary Switch

Figure 5:
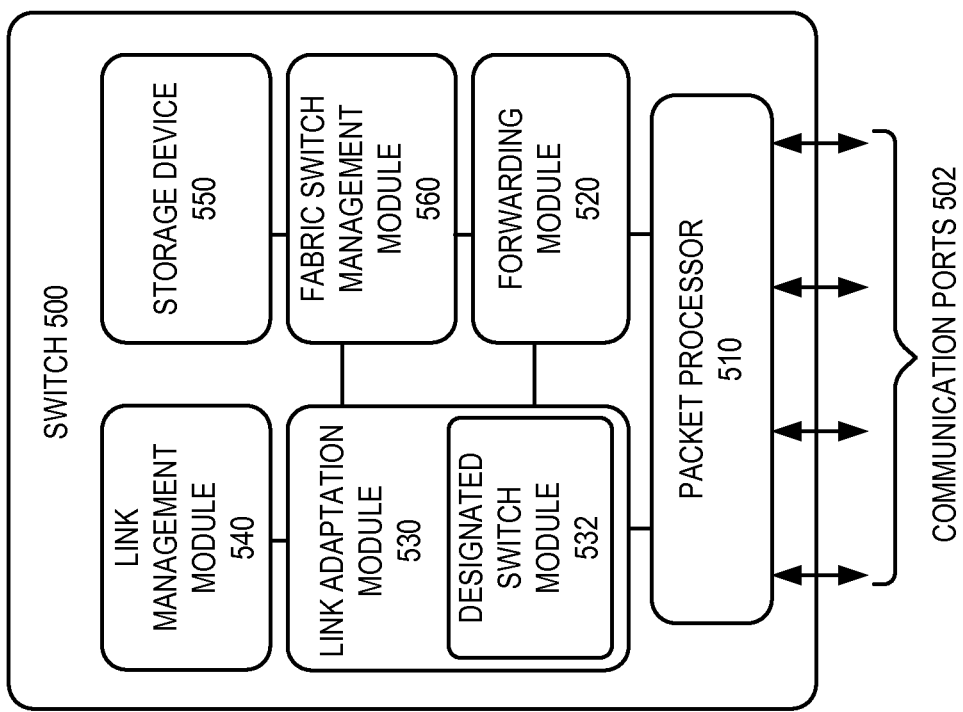
FIG. 5 illustrates an exemplary architecture of a switch with adaptive link aggregation and/or virtual link aggregation support, in accordance with an embodiment of the present invention.

FIG. 5 illustrates an exemplary architecture of a switch with adaptive link aggregation and/or virtual link aggregation support, in accordance with an embodiment of the present invention. In this example, a switch 500 includes a number of communication ports 502, a packet processor 510, a link management module 540, a forwarding module 520, a link adaptation module 530, and a storage device 550. Packet processor 510 extracts and processes header information from the received frames.

In some embodiments, switch 500 may maintain a membership in a fabric switch, wherein switch 500 also includes a fabric switch management module 560. Fabric switch management module 560 maintains a configuration database in storage device 550 that maintains the configuration state of every switch within the fabric switch. Fabric switch management module 560 maintains the state of the fabric switch, which is used to join other switches. In some embodiments, switch 500 can be configured to operate in conjunction with a remote switch as an Ethernet switch. Under such a scenario, communication ports 502 can include inter-switch communication channels for communication within a fabric switch. This inter-switch communication channel can be implemented via a regular communication port and based on any open or proprietary format. Communication ports 502 can include one or more TRILL ports capable of receiving frames encapsulated in a TRILL header. Packet processor 510 can process these TRILL-encapsulated frames.

During operation, link management module 540 operates at least two ports of the communication ports 502 to form a link aggregation. This link aggregation operates as a single logical channel. Forwarding module 520 determines an egress port for a packet among the ports participating in the link aggregation based on the distribution policy for the link aggregation. Link adaptation module 530 detects any imbalance of the respective link utilizations among the links of the link aggregation based on one or more imbalance criteria, and applies one or more corrective actions to the distribution policy. Once the corrective actions have been applied to the distribution policy, link adaptation module 530 monitors the link utilizations of the links of the link aggregation. Link adaptation module 530 stops applying corrective actions based on the monitored link utilizations' compliance with reaching an upper bound and/or meeting the convergence criteria, as described in conjunction with FIG. 2C. If the compliance is met, link adaptation module 530 applies the corrective settings, otherwise applies the fallback settings.

In some embodiments, link management module 540 operates a port of the communication ports 502 in conjunction with a remote switch to form a virtual link aggregation. Link adaptation module 530 detects an imbalance of the respective overall utilizations of links of the virtual link aggregation between the switch and the remote switch based on one or more imbalance criteria. In some embodiments, switch 500 also includes a designated switch management module 532, which identifies switch 500 as a designated switch for the virtual link aggregation. Link adaptation module 530 then generates an instruction for an ingress switch of the packet to apply one or more corrective actions to the path selection policy for the virtual link aggregation.

In some embodiments, once the corrective actions have been applied to the distribution policy, link adaptation module 530 generates a query message for the remote switch to obtain monitored link utilizations of the links of the virtual link aggregation. Link adaptation module 530 also determines whether to stop applying the corrective actions to the path selection policy and/or the distribution policy based on local monitored link utilizations and obtained monitored link utilizations from the remote switch.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch, a method and a system for protection switching over a virtual link aggregation. In one embodiment, the switch comprises a plurality of ports, a link management module, a forwarding module, and a link adaptation module. The link management module operates at least two ports of the plurality of ports of the switch to form a link aggregation. This link aggregation operates as a single logical channel. The forwarding module determines an egress port for a packet among the ports participating in the link aggregation based on a distribution policy. The link adaptation module detects an imbalance of the respective link utilizations among links of the link aggregation based on one or more imbalance criteria, and applies one or more corrective actions to the distribution policy.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
a plurality of ports;
link management circuitry configured to operate at least two ports of the plurality of ports of the switch to form a link aggregation, wherein the link aggregation operates as a single logical channel;
forwarding circuitry configured to determine an egress port among the ports participating in the link aggregation for a packet of a data flow based on a calculation function associated with a distribution policy, wherein a first value obtained from computing the calculation function for the packet indicates the egress port; and
link adaptation circuitry configured to:
in response to detecting an imbalance of respective link utilizations among links of the link aggregation, modify the calculation function associated with the distribution policy, wherein a second value obtained from computing the modified calculation function for a packet of the data flow indicates a different port among the ports participating in the link aggregation.

2. The switch of claim 1, wherein the link adaptation circuitry is further configured to monitor the link utilizations of the links of the link aggregation after modifying the calculation function.

3. The switch of claim 2, wherein the link adaptation circuitry is further configured to stop modifying the calculation function based on the monitored link utilizations' compliance with one or more of:
reaching an upper bound of the number of modifications; and
meeting convergence criteria; wherein the convergence criteria include one or more of:
achieving a better balance of link utilizations among links of the link aggregation compared to the detected imbalance; and
achieving compliance with the one or more imbalance criteria.

4. The switch of claim 3, wherein the link adaptation circuitry is further configured to apply one of:
a set of fallback settings to the distribution policy in response to reaching the upper bound; and
a set of corrective settings to the distribution policy in response to meeting the convergence criteria.

5. The switch of claim 1, wherein the imbalance criteria include one or more of:
a number of links in the link aggregation having higher utilization than a high threshold; and
a number of links in the link aggregation having lower utilization than a low threshold.

6. The switch of claim 1, wherein the calculation function associated with the distribution policy includes one or more of:
a hash function, wherein input of the hash function includes one or more fields of a packet; and
a modulo function generating an index for a hash distribution table, wherein input of the modulo function includes output of the hash function, and wherein a respective slot in the hash distribution table is associated with a link of the link aggregation.

7. The switch of claim 1, wherein the modification to the calculation function includes one or more of:
swapping adjacent bits of an input of the calculation function;
changing flavor of the calculation function by selecting one or more different fields of a packet as an input of the calculation function; and
changing flavor of the calculation function by using a different calculation function.

8. The switch of claim 1, wherein the link utilization of a link in the link aggregation is based on a weighted average of a measured link utilization and historical link utilization of the link.

9. The switch of claim 1, wherein the link management circuitry is further configured to operate a first port of the plurality of ports of the switch in conjunction with a second port of a remote switch to form a virtual link aggregation, wherein the virtual link aggregation operates as a single logical channel, and wherein the virtual link aggregation couples the switch and the remote switch to an end device; and wherein the link adaptation circuitry is further configured to detect an imbalance of respective overall utilizations of links of the virtual link aggregation between the switch and the remote switch based on one or more imbalance criteria.

10. The switch of claim 9, further comprising designated switch management circuitry configured to identify the switch as a designated switch for the virtual link aggregation; and wherein the link adaptation circuitry is further configured to generate, in response to identifying the switch as the designated switch, an instruction for an ingress switch of the packet to apply one or more corrective actions to a path selection policy for the virtual link aggregation, wherein the path selection policy indicates an egress switch for the packet between the switch and the remote switch.

11. The switch of claim 10, wherein the link adaptation circuitry is further configured to:

obtain link utilizations of the links of the virtual link aggregation monitored by the remote switch from a query response message from the remote switch; and determine whether to stop applying the corrective actions to the path selection policy based on local-monitored link utilizations and link utilizations monitored by the remote switch.

12. The switch of claim 1, wherein the switch is a member of a network of interconnected switches, wherein the network of interconnected switches is controlled as a single logical switch.

13. A method, comprising:

operating at least two ports of a plurality of ports of a switch to form a link aggregation, wherein the link aggregation operates as a single logical channel;

determining an egress port among the ports participating in the link aggregation for a packet of a data flow based on a calculation function associated with a distribution policy, wherein a first value obtained from computing the calculation function for the packet indicates the egress port; and in response to detecting an imbalance of respective link utilizations among links of the link aggregation, modifying the calculation function associated with the distribution policy, wherein a second value obtained from computing the modified calculation function for a packet of the data flow indicates a different port among the ports participating in the link aggregation.

14. The method of claim 13, further comprising monitoring the link utilizations of the links of the link aggregation after modifying the calculation function.

15. The method of claim 14, further comprising stopping modifying the calculation function based on the monitored link utilizations' compliance with one or more of:

reaching an upper bound of the number of modifications; and meeting convergence criteria; wherein the convergence criteria include one or more of:

achieving a better balance of link utilizations among links of the link aggregation compared to the detected imbalance; and achieving compliance with the one or more imbalance criteria.

16. The method of claim 15, further comprising applying one of:

a set of fallback settings to the distribution policy in response to reaching the upper bound; and a set of corrective settings to the distribution policy in response to meeting the convergence criteria.

17. The method of claim 13, wherein the imbalance criteria include one or more of:

a number of links in the link aggregation having higher utilization than a high threshold; and a number of links in the link aggregation having lower utilization than a low threshold.

18. The method of claim 13, wherein the calculation function associated with the distribution policy includes one or more of:

a hash function, wherein input of the hash function includes one or more fields of a packet; and a modulo function generating an index for a hash distribution table, wherein input of the modulo function includes output of the hash function, and wherein a respective slot in the hash distribution table is associated with a link of the link aggregation.

19. The method of claim 13, wherein the modification to the calculation function includes one or more of:

swapping adjacent bits of an input of the calculation function;

changing flavor of the calculation function by selecting one or more different fields of a packet as an input of the calculation function; and changing flavor of the calculation function by using a different calculation function.

20. The method of claim 13, wherein the link utilization of a link in the link aggregation is based on a weighted average of a measured link utilization and historical link utilization of the link.

21. The method of claim 13, further comprising:

operating a first port of the plurality of ports of the switch in conjunction with a second port of a remote switch to form a virtual link aggregation, wherein the virtual link aggregation operates as a single logical channel, and wherein the virtual link aggregation couples the switch and the remote switch to an end device; and detecting an imbalance of respective overall utilizations of links of the virtual link aggregation between the switch and the remote switch based on one or more imbalance criteria.

22. The method of claim 21, further comprising:

identifying the switch as a designated switch for the virtual link aggregation; and in response to identifying the switch as the designated switch, generating an instruction for an ingress switch of the packet to apply one or more corrective actions to a path selection policy for the virtual link aggregation, wherein the path selection policy indicates an egress switch for the packet between the switch and the remote switch.

23. The method of claim 22, further comprising:

obtaining link utilizations of the links of the virtual link aggregation monitored by the remote switch from a query response message from the remote switch, wherein the corrective actions have been applied to the path selection policy; and determining whether to stop applying the corrective actions to the path selection policy based on local monitored link utilizations and link utilizations monitored by the remote switch.

24. The method of claim 13, wherein the switch is a member of a network of interconnected switches, wherein the network of interconnected switches is controlled as a single logical switch.

25. A system, comprising:
one or more ports;
a processor;
a memory storing instructions that when executed by the processor cause the system to perform a method, the method comprising:
  operating at least two ports of ports of the system to form a link aggregation, wherein the link aggregation operates as a single logical channel;
  determining an egress port among the ports participating in the link aggregation for a packet of a data flow based on a calculation function associated with a distribution policy, wherein a first value obtained from computing the calculation function for the packet indicates the egress port;
  in response to detecting an imbalance of respective link utilizations among links of the link aggregation, modifying the calculation function associated with the distribution policy, wherein a second value obtained from computing the modified calculation function for a packet of the data flow indicates a different port among the ports participating in the link aggregation.

26. The system of claim 25, wherein the method further comprises monitoring the link utilizations of the links of the link aggregation after modifying the calculation function.

27. The system of claim 25, wherein the method further comprises:
  operating a first port of the plurality of ports of the system in conjunction with a second port of a remote system to form a virtual link aggregation, wherein the virtual link aggregation operates as a single logical channel, and wherein the virtual link aggregation couples the switch and the remote switch to an end device; and
  detecting an imbalance of respective overall utilizations of links of the virtual link aggregation between the system and the remote system based on one or more imbalance criteria.

28. The system of claim 27, further comprising:
identifying the system as a designated system for the virtual link aggregation; and
in response to identifying the system as a designated system, generating an instruction for an ingress switch of the packet to apply one or more corrective actions to a path selection policy for the virtual link aggregation, wherein the path selection policy indicates an egress system for the packet between the system and the remote system.

29. A switch means, comprising:
a plurality of port means;
a link management means for operating at least two port means of the plurality of port means of the switch means to form a link aggregation, wherein the link aggregation operates as a single logical channel;
a forwarding means for determining an egress port means among the port means participating in the link aggregation for a packet of a data flow based on a calculation function associated with a distribution policy, wherein a first value obtained from computing the calculation function for the packet indicates the egress port means; and
a link adaptation means for:
  in response to detecting an imbalance of respective link utilizations among links of the link aggregation, modifying the calculation function associated with the distribution policy, wherein a second value obtained from computing the modified calculation function for a packet of the data flow indicates a different port means among the port means participating in the link aggregation.

* * * * *